United States Patent
Jelinek (10) Patent No.: US 8,737,687 B2
(45) Date of Patent: May 27, 2014

(54) SYSTEM AND METHOD FOR TRACKING A SUBJECT USING RAW IMAGES AND TRACKING ERRORS

(75) Inventor: Jan Jelinek, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 215 days.

(21) Appl. No.: 13/341,454

(22) Filed: Dec. 30, 2011

(65) Prior Publication Data
US 2013/0170698 A1    Jul. 4, 2013

(51) Int. Cl.
*G06K 9/00*    (2006.01)

(52) U.S. Cl.
USPC .......................................................... 382/103

(58) Field of Classification Search
None
See application file for complete search history.

(56) References Cited

U.S. PATENT DOCUMENTS

| | | | |
|---|---|---|---|
| 2005/0047672 A1* | 3/2005 | Ben-Ezra et al. | 382/255 |
| 2010/0246989 A1* | 9/2010 | Agrawal et al. | 382/255 |
| 2012/0162359 A1* | 6/2012 | Kendrick et al. | 348/36 |

\* cited by examiner

*Primary Examiner* — Nirav G Patel
(74) *Attorney, Agent, or Firm* — Brooks, Cameron & Huebsch, PLLC (57) ABSTRACT

Image acquisition systems are described herein. One image acquisition system includes an image recording device configured to determine and record a tracking error associated with a raw image of a moving subject, and a computing device configured to deblur the raw image using the tracking error.

16 Claims, 6 Drawing Sheets

SYSTEM AND METHOD FOR TRACKING A SUBJECT USING RAW IMAGES AND TRACKING ERRORS

GOVERNMENT RIGHTS

The subject matter of this disclosure was made with government support under Contract Number W911 NF-10-C-0022 awarded by the Intelligence Advanced Research Projects Activity (IARPA). Accordingly, the U.S. Government has certain rights to subject matter disclosed herein.

TECHNICAL FIELD

The present disclosure relates to image acquisition systems.

BACKGROUND

Some previous approaches to acquiring high quality iris and/or face images of moving subjects include freezing the subject motion by using extremely short exposures. In such approaches, the subject may need to be brightly illuminated by a flash in order to obtain a well exposed image. However, such previous approaches may break down over large distances because the flash power used to obtain an acceptable image may become unsafe for the subject's eyes.

Producing a well exposed image without flash illumination, however, may require extending the image exposure, which can degrade the image quality. For example, extending the image exposure can introduce blur (e.g., motion blur for lateral motion in a plane perpendicular to the camera's optical axis) into the image unless the relative motion between the subject and the camera is reduced and/or eliminated.

Image acquisition systems using orthogonal transfer charge-coupled device (OTCCD) sensors can stabilize the projection of a moving subject on to the sensor by shifting the sensor's pixels' potential wells so as to counter the motion. This image projection stabilization can be performed by a control system that optically measures the actual location of the moving subject in the image and shifts the OTCCD array in real time to track the motion of the subject as close as possible. However, as good as such a control system may be able to track the motion of the subject, in practice it can not operate without a tracking error. The tracking error is manifested as the motion blur and degrades the quality of the resulting OTCCD image.

DETAILED DESCRIPTION

Image acquisition systems are described herein. For example, one or more embodiments include an image recording device configured to determine and record a tracking error associated with a raw image of a moving subject, and a computing device configured to deblur the raw image using the tracking error.

Image acquisition systems in accordance with one or more embodiments of the present disclosure can effectively deblur (e.g., reduce or remove motion blur from) images of moving subjects. As used herein, a deblurred image is an image that has reduced blurring or no blurring as compared to the originally captured image.

For example, image acquisition systems that include orthogonal transfer charge-coupled device (OTCCD) sensors in accordance with one or more embodiments of the present disclosure can reduce or remove the blur from images of moving subjects caused by tracking error. Accordingly, image acquisition systems in accordance with one or more embodiments of the present disclosure can produce increased quality images as compared with previous image acquisition systems.

Further, image acquisition systems in accordance with one or more embodiments of the present disclosure can deblur images of moving subjects without the addition of any new components or elements to the image acquisition system. For example, image acquisition systems that include OTCCD sensors in accordance with one or more embodiments of the present disclosure can deblur images of moving subjects using the tracking error associated with the image, which is already determined by, present in, and/or readily available in the image acquisition system. Accordingly, image acquisition systems in accordance with one or more embodiments of the present disclosure can deblur images of moving subjects at no extra and/or additional cost of the camera hardware.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of image frames" can refer to one or more image frames.

Figure 1:
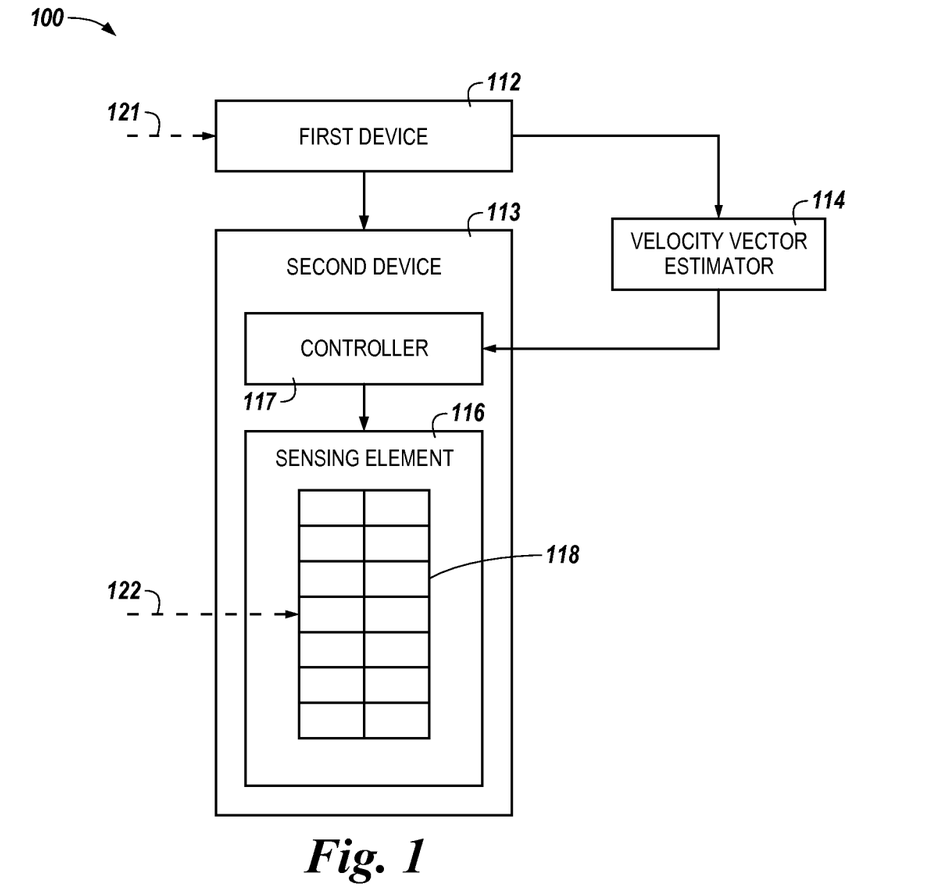
FIG. 1 illustrates an image acquisition system in accordance with one or more embodiments of the present disclosure.

FIG. 1 illustrates an image acquisition system 100 in accordance with one or more embodiments of the present disclosure. As shown in FIG. 1, image acquisition system 100 includes a first image recording device 112. First image recording device 112 can record (e.g., capture and/or acquire) a number of images (e.g., a series of images) of a subject (e.g., a moving subject).

As shown in FIG. 1, image acquisition system 100 includes a lateral velocity vector estimator 114. Lateral velocity vector estimator 114 can receive the recorded images from first image recording device 112 and estimate the lateral velocity vectors of the subject relative to image acquisition system 100.

As shown in FIG. 1, image acquisition system 100 includes a second image recording device 113. Second image recording device 113 can include an orthogonal transfer charge-coupled device (OTCCD) sensing element 116, as illustrated in FIG. 1.

Second image recording device 113 (e.g., OTCCD sensing element 116) can record a target image of the subject. For example, as shown in FIG. 1, OTCCD sensing element 116 can include an array of pixels 118 that can capture the target image.

The subject can be located a distance of, for example, up to 50 feet away from OTCCD sensing element 116 when the target image of the subject is recorded. However, embodiments of the present disclosure are not limited to a particular distance between the subject and OTCCD sensing element 116.

As shown in FIG. 1, image acquisition system 100 includes a controller 117. Controller 117 can shift the array of pixels 118 of OTCCD sensing element 116 based on the lateral velocity vector estimates provided by lateral velocity vector estimator 114.

For example, controller 117 can predict a location of the subject at a particular point in time based on the lateral velocity vector estimates, and then shift the array of pixels 118 of the OTCCD sensing element 116 so as it arrives at the predicted location at the particular point in time. Controller 117 can also determine, based on the lateral velocity vector data, the actual location of the subject at the particular point in time after enough time elapses to turn the predicted time into the present time.

In some embodiments, first image recording device 112 can be a camera. However, embodiments of the present disclosure are not so limited, and first image recording device 112 can be any device capable of sending a number of (e.g., a series) of images of the subject to lateral velocity vector estimator 114. For example, in some embodiments, first image recording device 112 can be a scanning laser range finder measuring the velocity vector of the subject relative to image acquisition system 100 in real time (e.g., as the subject moves).

Lateral velocity vector estimator 114 can be any device capable of receiving a number of images of the subject from first image recording device 112. For example, lateral velocity vector estimator 114 can use data from a scanning laser range finder, or depth images from a camera whose sensor has pixels capable of real time time-of-flight ranging.

Image acquisition system 100 can include a closed loop control such that estimates are applied immediately after they are computed (e.g., in real time) while the OTCCD image is still being exposed. The rate of updates may be dictated by the frame rate of first image recording device 112, and may, for example, number tens to thousands per exposure. Further, the number of updates may be the same as the number of images in the series of images.

Using OTCCD sensor element 116 as the image stabilizing element can improve the performance of image acquisition system 100 because, unlike previous image stabilization concepts and/or systems, OTCCD sensor element 116 involves no moveable mechanical parts (e.g., lenses, mirrors, or sensor chips). Rather, OTCCD sensor element 116 moves the potential wells that correspond to pixel array 118 and accumulates their photoelectrons.

Since the wells do not have any inertia, the wells can be moved extremely fast by manipulating, in real time, the voltages that define the operation of OTCCD sensor element 116. With no movable mechanical parts, OTCCD sensor element 116 can offer an extremely rugged solution that is well suited for security and/or military applications, among other applications.

Further, OTCCD sensor element 116 can offer an appealing alternative to mechanically delicate tip-tilt mirrors and/or movable stabilizing lenses. For example, OTCCD sensor element 116 can stabilize the image not by mechanically reconfiguring the optics and/or moving the sensing chip, but rather by electronically changing the location of pixel array 118.

Since image acquisition system 100 employs an image stabilization concept, image acquisition system 100 needs to estimate the relative velocity between the subject and image acquisition system 100 in order to properly drive OTCCD sensor element 116. The velocity vector can be estimated before or during the image exposure. Estimating the velocity vector before the image exposure can be done in simple scenarios (e.g., scenarios involving only the physical motion of the subject). In the latter case, the series of images provided to lateral velocity vector estimator 114 during the image exposure can be continuously evaluated as its frames are arriving to determine the velocity vector. The velocity vector updates can then be used to drive, in real time, the potential well movements in OTCCD sensor element 116.

In some embodiments, controller 117 can issue updates to OTCCD sensor element 116 at rates on the order of 100 updates per second, for example. The update can include, for example, calls for shifting the pixels of pixel array 118.

In some embodiments, OTCCD sensor element 116 can execute array shifts at rates on the order of 100,000 updates per second, for example. Further, OTCCD sensor element 116 may be able to execute single step shifts (e.g., one pixel left, right, or none and/or one pixel up, down, or none).

In the embodiment illustrated in FIG. 1, first image recording device 112 and second image recording device 113 record their respective images along different optical paths 121 and 122, respectively, from the subject. That is, first image recording device 112 records the series of images of the subject along a first optical path 121, and second image recording device 113 records the target image along a second (e.g., different) optical path 122. However, embodiments of the present disclosure are not so limited.

For example, in some embodiments, first image recording device 112 and second image recording device 113 can at least partially record their respective images along the same optical path from the subject. In such embodiments, the light can travel along a common optical path through a common lens. The light can then be split (e.g., using a splitter), with some light traveling along optical path 121 to first image recording device 112 and some light traveling along optical path 122 to second image recording device 113.

Depending on the hardware used in image acquisition system 100, first image recording device 112 and second image recording device 113 may record light at different, the same, or overlapping wavelengths. For example, in some embodiments, light having wavelengths in the visible range of the spectrum can be directed to first image recording device 112, and light having wavelengths in the near infrared range of the spectrum can be directed to second image recording device 113.

Figure 2:
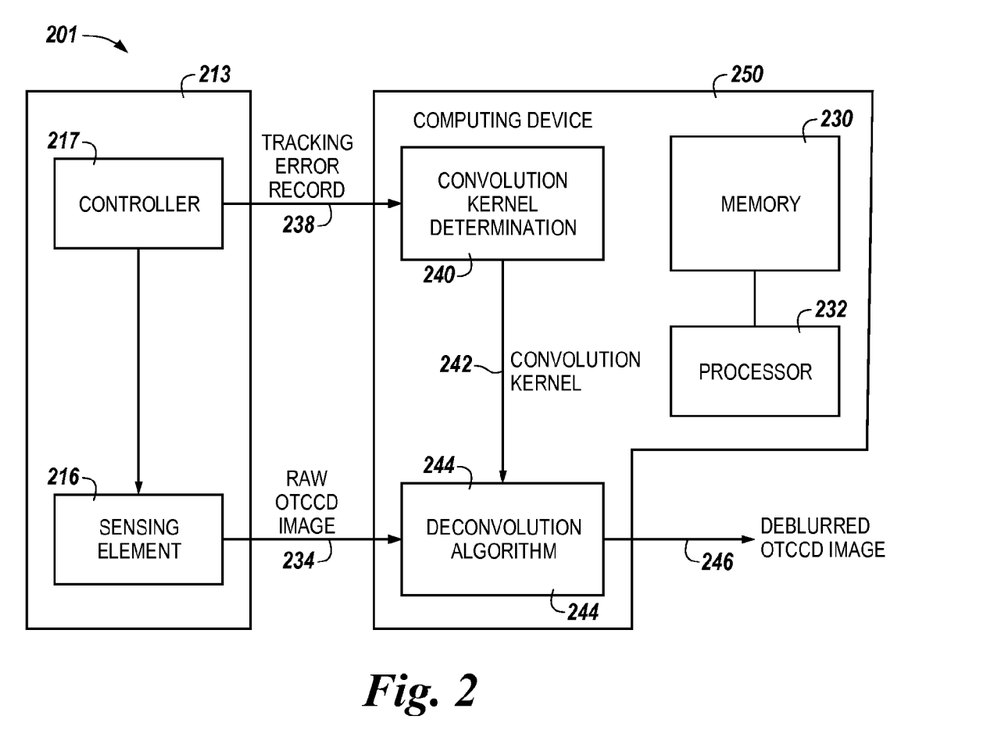
FIG. 2 illustrates an image acquisition system in accordance with one or more embodiments of the present disclosure.

FIG. 2 illustrates an image acquisition system 201 in accordance with one or more embodiments of the present disclosure. As shown in FIG. 2, image acquisition system 201 includes a device 213 having a controller 217 and a sensing element 216. Device 213, controller 217, and sensing element 216 can be, for example, second image recording device 113, controller 117, and sensing element 216, respectively, of image acquisition system 100 previously described in connection with FIG. 1.

As shown in FIG. 2, image acquisition system 201 includes a computing device 250 having a memory 230 and a processor 232 coupled to memory 230. Computing device 250 can be, for example, a laptop or desktop computer, among other types of computing devices.

Memory 230 can store executable instructions, such as, for example, computer readable instructions (e.g., software), that can be executed by processor 230 to perform various embodiments of the present disclosure. For example, memory 230 can be a non-transitory computer readable medium having computer readable instructions (e.g., computer program instructions) stored thereon that are executable by processor 232 to perform various embodiments of the present disclosure.

Memory 230 can be volatile or nonvolatile memory. Memory 230 can also be removable (e.g., portable) memory, or non-removable (e.g., internal) memory. For example, memory 230 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

In the embodiment illustrated in FIG. 2, memory 230 is located in computing device 250. However, embodiments of the present disclosure are not so limited. For example, in some embodiments, memory 230 can be located internal to another computing resource (e.g., enabling computer readable instructions to be downloaded over the Internet or another wired or wireless connection).

As shown in FIG. 2, controller 217 can determine and record tracking errors 238 associated with a raw (e.g., not yet post-processed) image 234 of a moving subject. Raw image 234 can be, for instance, an image previously captured by OTCCD sensing element 116 of second image recording device 113 previously described in connection with FIG. 1. That is, controller 217 can determine and record tracking errors 238 associated with raw image 234 as image 234 is being captured by OTCCD sensing element 116 (e.g., in-exposure).

The blur in image 234 can be, for example, a residual motion blur that results from the uncompensated motion of the subject relative to the OTCCD sensor array (e.g., from an inability of OTCCD sensing element 116 to perfectly track the motion of the subject). That is, tracking errors 238 associated with image 234 can correspond to (e.g., be manifested as and/or cause) the motion blur in image 234.

Tracking error record 238 associated with the raw OTCCD image 234 can be, for example, a list of pairs of the predicted and actually observed locations of a subject at different instants during the raw OTCCD image exposure. Those instants are the times at which first image recording device 112 previously described in connection with FIG. 1 captures its frames, and correspond to the sampling instants of the control loop.

As an example, tracking error 238 at a particular time can be the difference (e.g., discrepancy) between a location where the subject is predicted by the controller to be found in a particular future frame and a location where the subject was eventually actually found when the frame became available. That is, tracking error 238 can be determined by comparing the actual location of the subject at the particular point in time with the predicted location of the subject at the particular point in time. The predicted location of the subject at the particular point in time can be determined, for example, by controller 217 based on lateral velocity vector estimates, as previously described in connection with FIG. 1. The actual location of the subject at that time can be determined by examining the corresponding first device frame yet to be captured when the particular future time becomes the present. This can explain why the tracking errors may not be used to improve the real time tracking: because any controller can control only the future and thus must work with predictions, the errors are only available in retrospect. As such, the errors can be utilized for post-exposure image reconstruction in accordance with one or more embodiments of the present disclosure, but can not be used for improving the control loop behavior.

Figure 3:
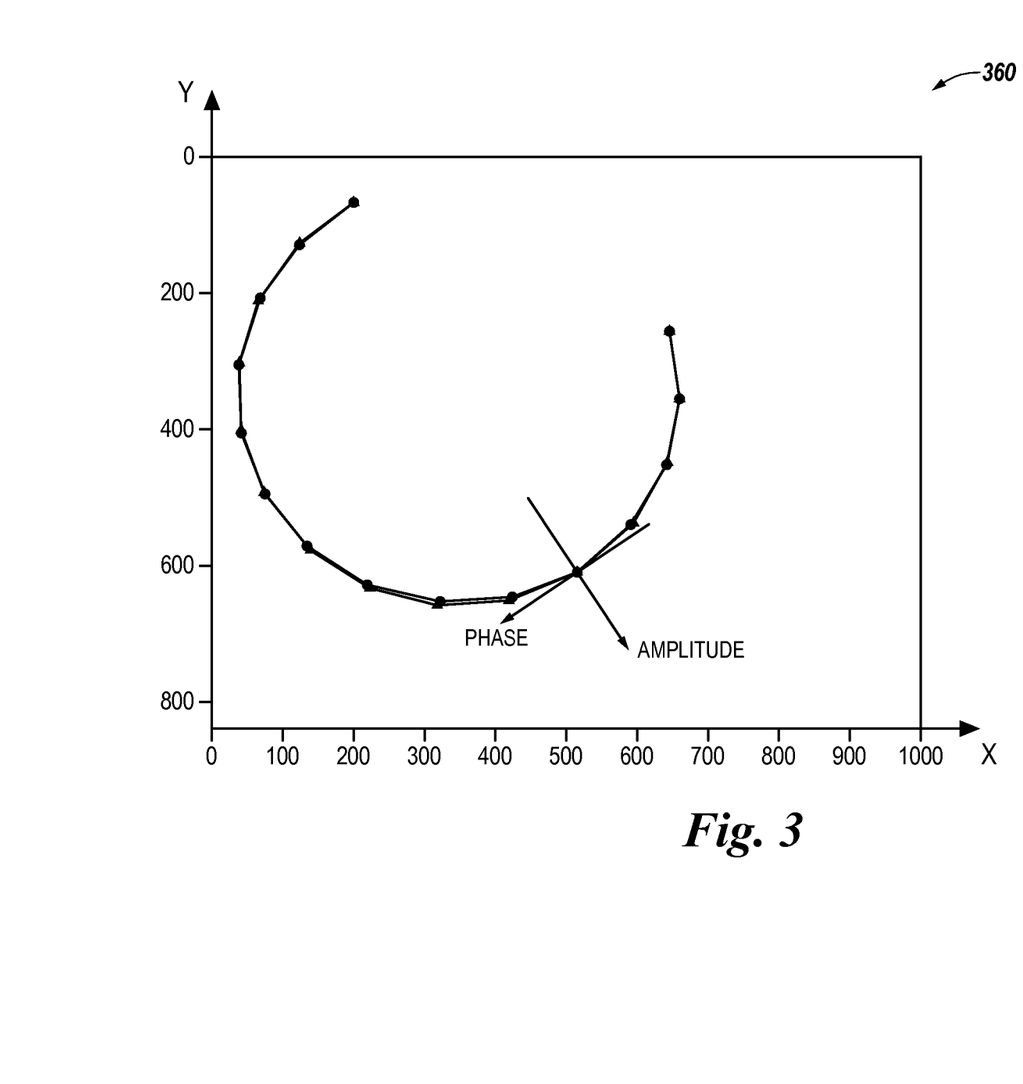
FIG. 3 illustrates a plot of the components of a tracking error in accordance with one or more embodiments of the present disclosure.

For instance, for circular motion, tracking error 238 can be understood by breaking each error vector into its amplitude and phase error components, as shown in plot 360 illustrated in FIG. 3. Instead of viewing the circular motion as a whole as it appears in the conventional x and y coordinates, a local coordinate system can be constructed and attached to the moving subject. The system will be two dimensional, but instead of x and y its coordinate axes are "amplitude" and "phase", as illustrated in FIG. 3. In such a system, the predicted locations may appear moving as erratic satellites orbiting the actual locations, all of which now appear stationary, firmly sitting at the origin.

Figure 4A:
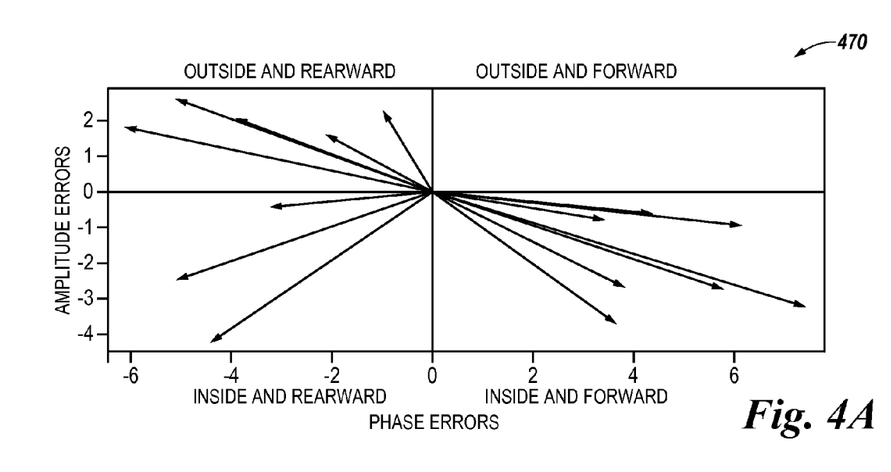
FIGS. 4A and 4B illustrate plots of tracking error data in accordance with one or more embodiments of the present disclosure.
Figure 4B:
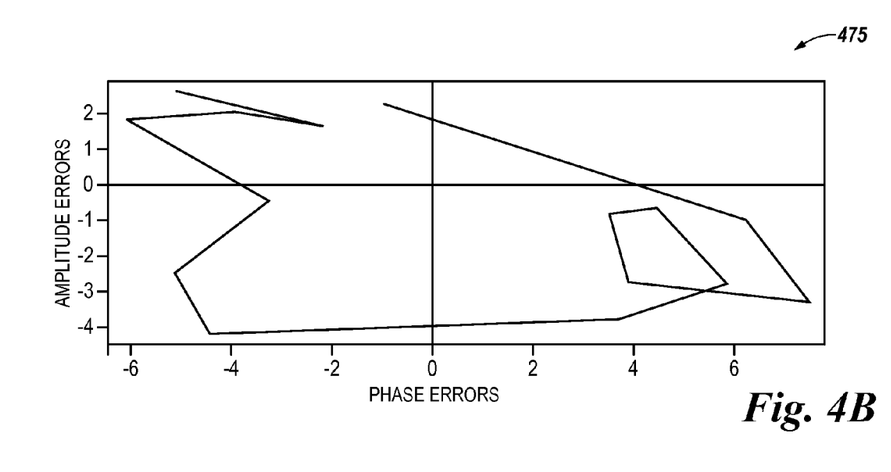

FIGS. 4A and 4B illustrate plots 470 and 475, respectively, of data showing this concept. FIGS. 4A and 4B are different renditions of the same data. The amplitude error represents the difference between the radii of the predicted location of the subject at the particular point in time and the actual location of the subject at the same point in time. The phase error measures how much ahead or behind the predicted locations were relative to those actually observed. Tracking errors at each control loop sampling instant (e.g., at the instants when the first device frames are captured) are two dimensional vectors that reflect the mutual spatial relationship between the predicted and actually observed locations. In FIG. 4B, the vector tips are connected by straight line segments, suggesting a motion. This observation is an approximation of a real motion trajectory that is causing real motion blur. Embodiments of the present disclosure can improve the raw image by undoing the blurring effects of this motion.

Figure 5:
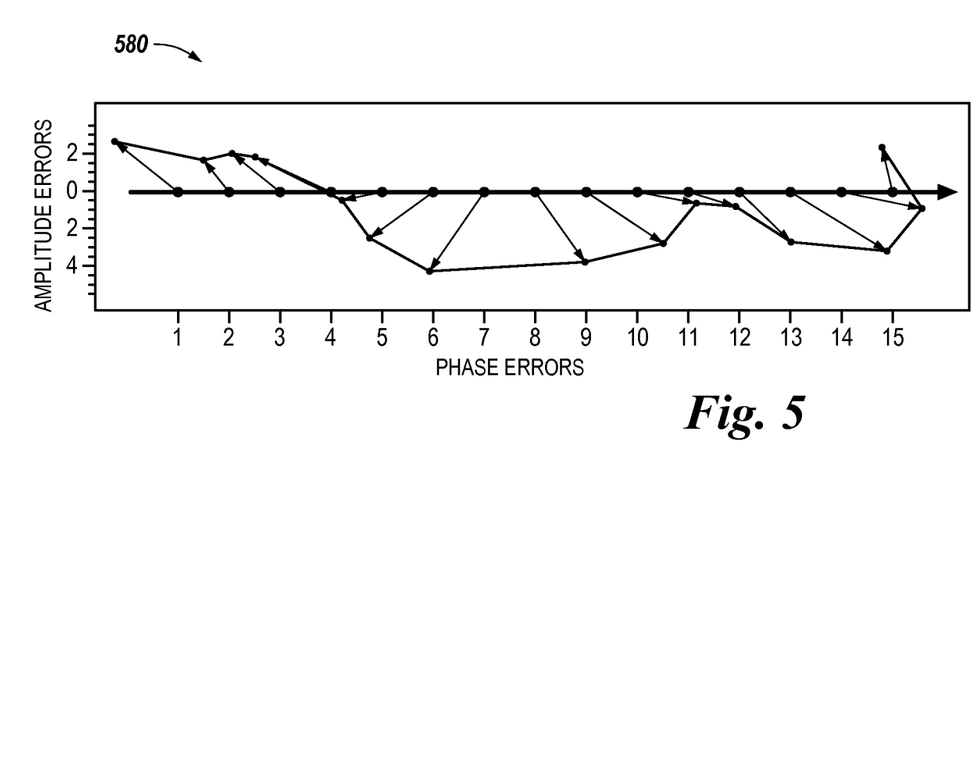
FIG. 5 illustrates a plot of a tracking error associated with an image of a moving subject captured in accordance with one or more embodiments of the present disclosure.

FIG. 5 illustrates a plot 580 of a tracking error associated with an image of a moving subject captured in accordance with one or more embodiments of the present disclosure. FIG. 5 shows the same data as FIG. 4A.

As shown in FIG. 5, plot 580 includes a number of (e.g., 15) vectors. Each vector represents the tracking error associated with a different image frame captured by first image recording device 112 during the exposure of the OTCCD image. For example, the vector originating from the first dot from the left on the x-axis represents the tracking error associated with the first image frame of the image, the vector originating from the second dot from the left on the x-axis represents the tracking error associated with the second image frame of the image, etc. The first device frames have exposure times that are much shorter than the OTCCD exposure. The particular times, at which they are taken, define the sampling instants of the control loop. For example, the first device exposures can last 1 millisecond (ms) each and are taken every 10 ms during the OTCCD image exposure, which can be 500 ms.

Plot 580 illustrates both the amplitude error component and the phase error component of the tracking error. The amplitude error is measured along the y-axis of plot 580, and the phase error is measured along the x-axis of plot 580. That is, the magnitude (e.g., length) of the y-component of each vector measured along the y-axis (e.g., in the vertical direction) represents the magnitude (e.g., amount) of the amplitude error associated with the different image frames, and the magnitude of the x-component of each vector measured along the x-axis (e.g., in the horizontal direction) represents the magnitude of the phase error associated with the different image frames.

As an example, consider the tracking error associated with the second, fifth, eleventh, and fifteenth image frames (e.g., the vectors originating from the second, fifth, eleventh, and fifteenth dots from the left on the x-axis). The tracking error associated with these image frames is relatively smaller than the tracking error associated with the other image frames, as represented by the shorter length of these vectors. Further, the magnitudes of the amplitude and phase errors associated with the second image frame are approximately equal (e.g., the amplitude and phase error components of the tracking error associated with the second image frame are approximately equal), the magnitudes of the amplitude errors associated with the fifth and eleventh image frames are relatively smaller than the magnitudes of the phase errors associated with the fifth and eleventh image frames (e.g., phase error constitutes the majority of the tracking error associated with the fifth and eleventh image frames), and the magnitude of the amplitude error associated with the fifteenth image frame is relatively larger than the magnitude of the phase error associated with the fifteenth image frame (e.g., amplitude error constitutes the majority of the tracking error associated with the fifteenth image frame), as represented by their respective vectors.

In the example illustrated in FIG. 5, the scale of the x-axis is the same as the scale of the y-axis. Further, the unit of both the x-axis and y-axis is pixels. Accordingly, in the example illustrated in FIG. 4, the amplitude errors, the phase errors, and the magnitudes of the vectors are measured in the same units (e.g., pixels).

As shown in FIG. 2, at block 240, computing device 250 can determine (e.g., compute and/or define) a convolution kernel 242 based, at least in part, on tracking error 238. Convolution can be, for example, an operation in which the finalized pixel is the weighted sum of the neighboring pixels. Such a convolution operation can, for example, be based on a matrix which gives some weight to each one of the neighboring pixels. This matrix is called the convolution kernel. That is, convolution kernel 242 can be a matrix.

Convolution kernel 242 can be, for example, a square matrix that is 3 pixels×3 pixels, 5×5, or 7×7, among other arrangements. However, embodiments of the present disclosure are not limited to a particular shape, size, or arrangement for convolution kernel 242. Its size can be determined, for instance, by data present in tracking error record 238. For example, convolution kernel 242 can be any shape or arrangement such as, for instance, a square, rectangle, or more complicated shapes or arrangements as may be desired.

Convolution kernel 242 can be applied to raw OTCCD image 234, whose rows and column directions can define the x-y coordinates; because convolution kernel 242 is applied to it, it must be expressed in the same x-y coordinates (e.g., not in the amplitude-phase coordinates). Convolution kernel 242 can be constructed from the motion trajectory shown in FIG. 4B by, for example, transforming the trajectory from the amplitude-phase coordinates into the x-y coordinates, and then assigning its segments weights scaling their different lengths to the same sampling period, vector summing the segments, and normalizing the resulting matrix so that all kernel entries together add up to one.

Figure 6:
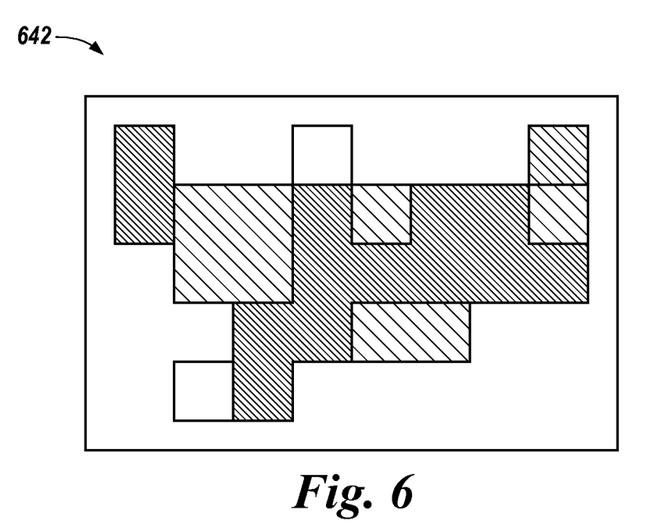
FIG. 6 illustrates a convolution kernel computed in accordance with one or more embodiments of the present disclosure.

FIG. 6 illustrates a convolution kernel 642 computed from the residual motion trajectory in FIG. 4B that was produced from the tracking errors in FIG. 4A. In the embodiments illustrated in FIG. 6, convolution kernel 642 is a 5×8 matrix. The shading of its corresponding squares is proportional to the kernel entry values.

In some embodiments, connecting the error vector end points by straight line segments points as in FIG. 4B can be replaced by more complex motion trajectory approximations to obtain more accurate kernels. For example, in some embodiments, circular arcs can be used.

The size (e.g., dimensions) of convolution kernel 242 can be based, at least in part, on the size (e.g., the magnitude and/or amount) of tracking error 238. For example, the greater the tracking error 238 associated with image 234, the greater the size of the convolution kernel 242.

As shown in FIG. 2, at block 244, computing device 250 can apply a deconvolution algorithm 244, that applies convolution kernel 242, to raw OTCCD image 234, to produce a deblurred image 246. Deconvolution algorithm 244 can be, for example, a suitable deconvolution algorithm known in the image processing field such as, for example, the Richardson-Lucy algorithm, that can be used to deblur an image.

Reconstructing an image in accordance with one or more embodiments of the present disclosure may not be an inexpensive substitute for an expensive precision tracking control system. For example, a good reconstruction may not be achieved unless there are at least short intervals during exposure when the tracking errors drop to zero or at least close to zero, both in magnitude and phase (e.g., as the error vector lengths approach zero). That is, the tracking control may not be perfect at all times, but may be perfect or close to perfect at least for short parts of the overall exposure. The longer the parts, the better will be the reconstruction.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure. In particular, circular motion of the subject was selected only for the sake of explanation. Embodiments of the present disclosure are not limited to any particular motion.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An image acquisition system, comprising:
   an image recording device configured to determine and record a tracking error associated with a raw image of a moving subject, wherein the raw image is expressed in x-y coordinates; and
   a computing device configured to deblur the raw image using the tracking error by:
      determining a convolution kernel based, at least in part on the tracking error, wherein:
         the convolution kernel is constructed from a residual motion trajectory approximation resulting from the tracking error; and
         constructing the convolution kernel includes transforming the residual motion trajectory approximation into the x-y coordinates in which the raw image is expressed; and
      applying the convolution kernel to the raw image.

2. The image acquisition system of claim 1, wherein:
   the residual motion trajectory approximation includes segments of different lengths; and
   constructing the convolution kernel includes assigning the segments of the residual motion trajectory approximation weights scaling the different lengths of the segments to a same sampling period.

3. The image acquisition system of claim 2, wherein constructing the convolution kernel includes vector summing the weighted segments of the residual motion trajectory approximation.

4. The image acquisition system of claim 3, wherein:
   vector summing the weighted segments of the residual motion trajectory approximation results in a matrix; and
   constructing the convolution kernel includes normalizing the matrix so that all kernel entries of the matrix together add up to one.

5. The image acquisition system of claim 1, wherein the tracking error associated with the raw image corresponds to a motion blur of the raw image.

6. A method of operating an image acquisition system, comprising:
   determining and recording a tracking error associated with a raw image of a moving subject, wherein determining the tracking error includes comparing an actual location of the moving subject at particular point in time with a predicted location of the moving subject at the particular point in time;
   determining a convolution kernel based, at least in part, on the tracking error; and
   applying the convolution kernel to the raw image to produce a deblurred image.

7. The method of claim 6, wherein applying the convolution kernel to the raw image includes applying a deconvolution algorithm that applies the convolution kernel to the raw image.

8. The method of claim 6, wherein the convolution kernel is a matrix.

9. The method of claim 6, wherein a size of the convolution kernel is based, at least in part, on a size of the tracking error associated with the image.

10. The method of claim 6, wherein the predicted location of the moving subject is determined based, at least in part, on lateral velocity vector estimates.

11. An image acquisition system, comprising:
    an image recording device, wherein the image recording device includes:
       a sensing element configured to capture a motion-stabilized image of a moving subject; and
       a controller configured to:
          determine and record a tracking error associated with the image;
          predict a location of the subject at a particular point in time:
          shift the sensing element such that projection of the moving subject at the particular point in time coincides with the predicted location on the sensing element; and
          determine an actual location of the subject at the particular point in time after the image recording device captures the image of the moving subject at the predicted location at the. particular point in time; and
       a computing device configured to remove a blur from the image using the tracking error.

12. The image acquisition system of claim 11, wherein the tracking error associated with the image of the moving subject is a difference between the predicted location of the subject at the particular point in time and the actual location of the subject at the particular point in time.

13. The image acquisition system of claim 11, wherein the sensing element is an orthogonal transfer charge-coupled device sensing element.

14. The image acquisition system of claim 11, wherein the controller is configured to determine the tracking error associated with the image as the image is captured.

15. The image acquisition system of claim 11, wherein the blur removed from the image is a residual motion blur resulting from uncompensated motion of the subject relative to the sensing element.

16. An image acquisition system, comprising:
    an image recording device configured to determine and record a tracking error associated with a raw image of a moving subject; and
    a computing device configured to deblur the raw image using the tracking error by;
       determining a convolution kernel based, at least in part, on the tracking error, wherein:
          the convolution kernel is constructed from a residual motion trajectory approximation resulting from the tracking error;
          the residual motion trajectory approximation includes segments of different lengths; and
          constructing the convolution kernel includes assigning the segments of the residual motion trajectory approximation weights scaling the different lengths of the segments to a same sampling period; and
       applying the convolution kernel to the raw image.

* * * * *